Figure 1:
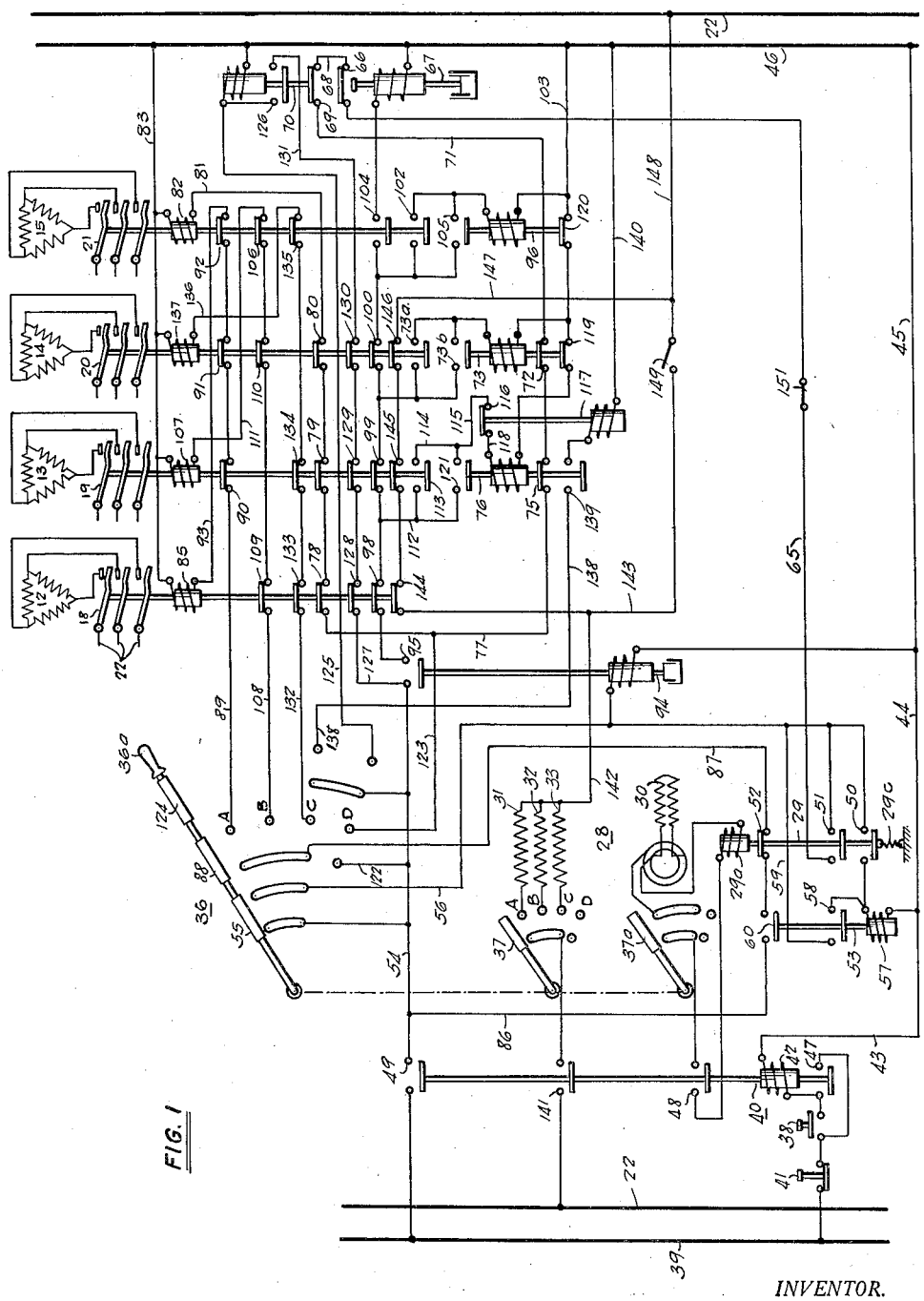

March 21, 1939.  W. M. SCOTT, JR  2,151,237

SYSTEM OF MOTOR CONTROL

Filed Aug. 6, 1937  2 Sheets-Sheet 1

INVENTOR.
WILLIAM M. SCOTT JR.
BY Cornelius D. Ehret
ATTORNEY.

March 21, 1939.  W. M. SCOTT, JR  2,151,237
SYSTEM OF MOTOR CONTROL
Filed Aug. 6, 1937   2 Sheets-Sheet 2
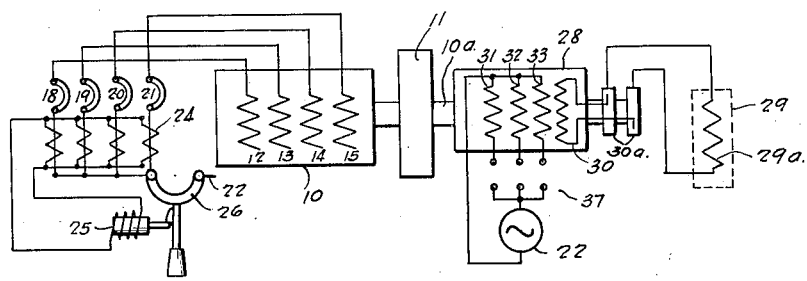
FIG. 2
FIG. 3
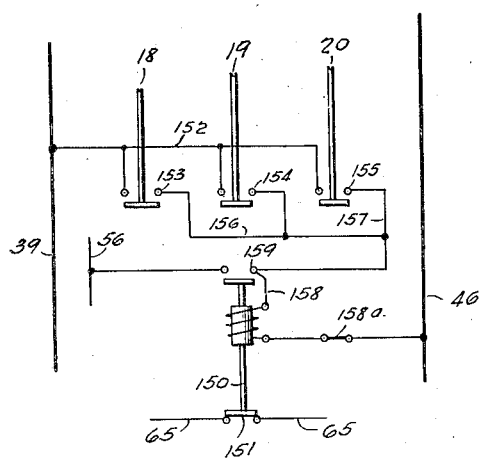
INVENTOR.
WILLIAM M. SCOTT JR.
BY
Cornelius L. Ehret
ATTORNEY.

Patented Mar. 21, 1939

2,151,237

UNITED STATES PATENT OFFICE 2,151,237

SYSTEM OF MOTOR CONTROL

William M. Scott, Jr., Bryn Mawr, Pa., assignor to I-T-E Circuit Breaker Company, Philadelphia, Pa., a corporation of New Jersey Application August 6, 1937, Serial No. 157,762

30 Claims. (Cl. 172—179)

My invention relates to systems of motor control and more particularly to the provision of a simple, inexpensive and reliable system for the control of an alternating current motor provided with a plurality of windings each adapted to operate the motor at a different speed but only one of which is suitable for accelerating or starting the motor.

This application is a continuation-in-part of my copending application Serial No. 77,101, filed April 30, 1936, for Methods and systems of motor control.

My invention is particularly useful in connection with a multi-speed alternating current motor or a plurality of motors which are directly connected to a load of relatively great inertia, such, for example, as a ventilating fan, and which on certain of the speeds produces relatively small starting torque. Special provision is made for starting and accelerating the load.

In accordance with a further aspect of my invention a multi-speed motor or group of motors has a system for connecting selected motor windings to a power source, one of the windings producing relatively great torque while each of the remaining windings produces relatively small torque and a different motor speed. The power connections for each winding are controlled by a relay system which insures acceleration of the load by energization of the winding or connection producing relatively great torque and generally the highest speed. For lower speeds the relay system automatically energizes the winding corresponding to the selected speed.

In accordance with a further aspect of my invention, in reducing the speed of the motor, the relay system prevents energization of the accelerating winding. Upon the attainment of the lower selected speed, however, the relay system automatically effects energization of the motor winding designed to operate the motor at the lower selected speed.

A further aspect of my invention resides in energizing one of the windings of the motor only when the motor is running at approximately the speed for which the selected winding is designed. More particularly, a frequency relay or equivalent means such as a speed responsive device is arranged in conjunction with other control devices to effect, at a given speed of the motor, de-energization of the accelerating winding, and energization of the selected running winding.

Further in accordance with my invention great flexibility in control is attained. In ventilating systems for buildings, tunnels, mines and the like, the ventilating fans are operated at different speeds depending upon the requirements. A large size fan presents substantial starting resistance and the power required to drive the fan increases as the square of the speed. That is, for twice a given speed, approximately four times as much power is required.

In accordance with the present invention, the lower speed operations are produced by a separate motor, or by a winding designed for efficient operation of the motor at the lower speed. The lower speed windings, having relatively small current carrying capacities, and producing relatively small torques, are not capable of producing sufficient torque to start the motor. Accordingly, one of the higher speed windings, which may operate the motor at four times the lowest speed, is used for starting and/or accelerating the motor.

By the term "winding" I refer to an electrical system of producing a predetermined number of magnetic poles in one of the relatively movable parts of a motor. For example, a group of coils may be connected to produce a different number of magnetic poles and consequently a different synchronous speed for each differing number of poles. The means for producing each particular speed will be referred to as a winding whether it be an independent system of coils, or a system of coils which may be selectively connected to produce different predetermined speeds.

My invention further resides in the combinations and arrangements described more particularly hereinafter.

For a more complete understanding of my invention, reference may now be had to the accompanying drawings wherein I have shown diagrammatically in Fig. 1 a control system embodying my invention;

Fig. 2 illustrates diagrammatically certain of the devices of Fig. 1 together with the motor connected to drive a fan or other load; and Fig. 3 illustrates a modified form of a portion of the circuit of Fig. 1.

Referring to the drawings, I have shown my invention in one form as applied to the control of a motor 10 connected to drive a fan 11. The motor, preferably of the multi-speed induction type, is provided with a plurality of stator windings 12, 13, 14 and 15 each of which is designed to produce a different rotor speed; for example, speeds of 300, 450, 600, 900 revolutions per minute. The motor may also comprise separate units mounted on the same or separate shafts and respectively including aforesaid stator windings 12—15.

Due to limitations of available space in the stator for the windings, and to reduce the cost, I have found it desirable to provide the motor 10 with one winding, the stator winding 15, of sufficient torque producing capacity to accelerate the motor from stand still to its maximum speed, whereas the remaining windings 12—14 are of minimum size and of torque producing capacity only sufficient to maintain the motor speed, together with its load, at the selected speeds which may be, as aforesaid, 300, 450, 600 revolutions per minute. In cases where it is undesirable or not convenient to build the motor with a plurality of windings, as aforesaid, several motors may be utilized. If desired, each motor may operate at the same speed, suitable gearing being provided to produce different speeds of the shaft 10a. In any event, one motor, or other starting means, is capable of starting the load and accelerating it to its maximum speed while additional windings on the motor may be used for lower speed operation; or, as above suggested, other motors of a size and capacity sufficient only to maintain the speed of load may be utilized for lower speeds of operation. In general, the separate motors are provided with the lower speed windings since they are called upon to develop relatively small torques and the iron losses may be reduced by a decreased size of motor.

As shown in Figs. 1 and 2, each of windings 12—15 is arranged to be connected by contactors 18, 19, 20 and 21 to a suitable source or sources of 60 cycle alternating current supply 22.

In Fig. 2 a single-line wiring diagram is illustrated, each of the single lines leading to the windings 12—15 representing a three-phase source of power supply 22. Preferably current transformers 24 are connected in circuit with each winding for the purpose of energizing a tripping coil 25 of an overload circuit breaker 26 in event of overload on or a short circuit of one of the windings 12—15. Each transformer is constructed to produce a tripping current upon the flow of a predetermined overload current to its associated motor winding.

In order selectively to control the contactors 18—21 in response to different speeds of the motor, I provide a control device 28 and a cooperating master relay 29 which is operated from one position to another by device 28 when the motor attains a predetermined selected speed. Preferably the control, or translating device 28 comprises a rotor, secured to an extension of the shaft 10a of the motor 10, provided with rotor winding 30 connected through slip rings 30a to operating coil 29a of relay 29.

Each of the three stator windings, 31, 32 and 33, of device 28 is wound to provide a different number of poles; for example, the winding 31 may provide twenty-four poles, the winding 32 sixteen poles, and the winding 33 twelve poles, corresponding, respectively, to speeds of the rotating fields thereof, of 300, 450 and 600 revolutions per minute. While the stator windings, as shown, may be energized from a source of three-phase alternating current 22 in the drawings indicated by single-line connections, it is generally satisfactory to connect a selected one of them to a single-phase source of supply. The result achieved, in either case, is that when the motor 10 is at a standstill alternating voltage will be generated in the rotor winding 30 at the same frequency as the voltage that is impressed on the selected stator winding. As the speed of motor 10 increases, the voltages and frequency induced in the rotor winding tend to decrease, reaching zero at synchronous speed. With the rotor winding 30 connected to the coil of the master relay the impedance of the circuit through which current flows is made up of resistance and inductance. The inductive reactance is proportional to the frequency. Hence, as the critical speed, corresponding to the synchronous speed as determined by the number of poles of the stator winding, is approached, the current flowing in the circuit is maintained at a relatively high value. This is because the inductive reactance decreases at the same time the voltage decreases. Finally, the reactance substantially disappears and the resistance of the circuit controls the flow of current. At that time, however, there is but a very small voltage induced in the winding 30 and a very small current flows. It is therefore seen that the relay coil remains substantially fully energized until a critical speed is reached at which time a further reduction in voltage causes the current to decrease rapidly and the coil is suddenly deenergized. This condition is substantially the same whether the critical speed is approached from a higher speed or from a lower speed.

Since the speed of the motor 10 which produces a minimum induced voltage in the rotor winding 30 of the device 28 is determined primarily by the number of poles of the respective stator windings 12—15, it will be understood that zero voltage and frequency occur at a speed which corresponds to the speed of a synchronous motor if it were provided with the same number of poles. For convenience, I shall refer to the synchronous speed of the stator windings 31, 32 and 33 and by synchronous speed I shall mean one which corresponds approximately to the speed a synchronous motor would have if it were provided with a number of poles corresponding with those of one of the windings 31, 32 and 33.

In connection with energization of windings 31, 32 and 33 from a three-phase source of supply (each winding then comprising three coils connected in delta or star), the direction of rotation of the magnetic field will depend upon the order of connections of the respective phases to the coils forming each of windings 31—33. I prefer to so connect the coils that the magnetic field rotates in the same direction as that of the rotor 30 driven by the motor 10. The three-phase device 28 may be preferred for those cases where protection is desired against possibility of reverse operation of the fan 11 or the motor 10. If such reverse operation occurs, it will be clear the relay 29 will not be actuated to its deenergized position since the rotating magnetic field will always induce, for all speeds, substantial voltage in the rotor winding 30.

With the foregoing understanding of certain of the elements of the system, it is believed that the invention as a whole will be best understood by now considering the operation of the system including the construction and arrangement of the various apparatus as well as the operation of the system as a whole.

Referring particularly to Fig. 1, a selector switch 36 is, by handle 36a or automatically, operable through four positions A, B, C and D corresponding to four operating speeds of the motor 10, but it is to be understood any number of positions may be provided for the desired number of motor speeds. The selector switch 36 also includes bridging members 37 and 37a operable concurrently through the same number of positions.

It will now be assumed that the switch 36 and the bridging members 37 and 37a have been operated to their first positions designated A and corresponding with the lowest operating speed of the motor 10 and that a normally open starting switch 38 has been momentarily depressed to complete an energizing circuit of a device designed to move to a deenergized position upon a predetermined decrease in voltage of the supply source and hereinafter referred to as a no-voltage relay 40. This circuit may be traced from the supply line 39 by the normally closed contacts of a stop switch 41, the contacts of starting switch 38, operating coil 42 of the no-voltage relay 40, and by conductors 43, 44 and 45 to the other supply line 46. The no-voltage relay 40 immediately operates to an energized position to close its contacts 47 to complete its own holding circuit which may be traced from the supply line 39, by stop switch 41, contacts 47, operating coil 42, and by conductors 43—45 to the supply line 46.

Concurrently with the completion of the circuit through contacts 47, circuits are completed through contacts 48, 49, and 141 of the no-voltage relay 40. The closing of the contacts 48 connects the rotor winding 30 of the device 28 in circuit with the operating coil 29a of the master relay 29. Since the motor 10 is at rest, the voltage induced in rotor winding 30 from the stator winding 31, energized through contacts 141, is sufficient to operate the master relay to its energized position to close its contacts 50 and 51 and to open its contacts 52.

The operation of the relay 29, preferably constructed of relatively light movable parts providing low inertia, primarily depends upon the generated frequency of the translating device 28. If desired, a spring 29c may be provided to bias the relay to its deenergized position. The spring serves to control the drop-out action of the relay; that is, in conjunction with the low inertia parts, to cause movement of the relay to deenergized position when its current passes through zero, and during the time the root-mean-square value of its current is near the drop-out value. The closing of the contacts 50 completes an energizing circuit for an interlock relay 53 which may be traced from the supply line 39 by contacts 49, conductor 54, bridging member 55 of the selector switch 36, conductor 56, contacts 50 of the master relay 29, operating coil 57 of the interlock relay 53 and by conductors 44, 45 to the other supply line 46. The interlock relay 53 then closes its contacts 58 to complete a holding circuit identical with the one just traced except the contacts 50 are now by-passed by conductor 59. At the same time, contacts 60 of the interlock relay are closed for purposes to be described hereinafter.

Immediately upon closure of the no-voltage relay 40 and the master relay 29, an energizing circuit is completed for the high speed and motor-accelerating contactor 21. This circuit may be traced from the supply line 39 by contacts 49 of no-voltage relay 40, conductor 54, bridging member 55, conductor 56, contacts 51 of relay 29, conductor 65, contacts 151 later to be described, normally closed contacts 66 of a time delay relay 67 operable with a time delay both in opening and closing the contacts 66, conductor 68, contacts 69 of interlock relay 70, conductor 71, contacts 72 of an interlock relay 73, contacts 75 of an interlock relay 76, conductor 77, interlock contacts 78, 79 and 80 of the open contactors 18—20, conductor 81, operating coil 82 of the contactor 21 and by conductor 83 to the other supply line 46.

The contactor 21 is thereupon operated to energize the stator winding 15 of the motor 10 for acceleration. As above described, this winding is designed for the heavy duty incident to the starting of the motor with its relatively heavy load comprising the fan 11. While I have not shown additional starting devices, it will be understood that such devices, as transformers, reactances, resistances, or the like, may be utilized as may be desired.

Upon energization of the stator winding 15, the motor immediately begins to rotate at gradually increasing speed. As the speed of the motor 10 approaches that synchronous speed determined by the poles of the selected stator winding 31 of the device 28, the voltage and frequency induced in winding 30 are reduced. The current flowing to operating coil 29a is not correspondingly reduced because of the inductance. Upon attainment of that predetermined speed, however, the current is abruptly reduced. At that speed, the winding 30 in its relation to the rotating field produced by the selected stator winding 31 is stationary. Consequently the relay 29 moves to close its contacts 52 and to open its contacts 50 and 51. The opening of the contacts 51 interrupts the energizing circuit of the contactor 21 which immediately operates to its open position to deenergize the high-speed motor winding 15.

At the same time an energizing circuit is completed for the operating coil 85 of the contactor 18 which may be traced from the supply line 39, contacts 49, conductor 86, contacts 60 and 52 of relays 53 and 29, conductor 87, bridging member 88, conductor 89, interlock contacts 90, 91 and 92 of contactors 19, 20 and 21, conductor 93, operating coil 85 of contactor 18, and by conductor 83 to the other supply line 46. The contactor 18 thereupon closes to energize the stator winding 12 for operation of the motor at a speed corresponding to the No. 1 or "A" position of the selector switch 36, which speed may be of the order of 300 revolutions per minute. The stator winding 12, whether a part of the motor 10 or comprising the stator winding of a separate motor, is of a size only adequate to produce sufficient torque on its cooperating rotor to maintain the speed of the fan 11 at a predetermined value.

During the foregoing sequence of operations, more particularly upon movement of selector switch 36 to one of its first three contact positions, an energizing circuit is completed for the timing relay 94 which may be traced from the supply line 39 by contacts 49, conductor 54, bridging member 55, conductor 56, operating coil of the timing relay 94, and by conductor 45 to the other supply line 46. The timing relay 94 immediately closes its contacts 95 partially to complete an energizing circuit for the operating coil of an interlock relay 96. This circuit may be traced from the supply line 39, contacts 49, conductor 54, contacts 95 of relay 94, interlock contacts 98, 99 and 100 of contactors 18, 19 and 20, and upon closure of contactor 21 the circuit is completed by contacts 102 thereof through conductor 103 to the other supply line 46. The relay 96 then seals itself in or completes its own holding circuit through its contacts 105. At the same time an energizing circuit, in part identical with the one for relay 96, and extending through interlock contacts 100 of contactor 20 and interlock contacts 104 of contactor 21, is completed to energize the operating coil of the timing relay 67. The relays 67, 94 and 96 are provided for the purpose of electrically interlocking the circuits to insure proper sequence of operations, particularly during deceleration. It may be further noted that the relay 67 is deenergized upon opening of the contactor 21 while the relay 96 is deenergized upon closure of the contactors 18, 19 or 20. If after a period of time normally sufficient for acceleration of motor 10 and its load 11 to its third speed, the relay 29 has not been deenergized to complete an energizing circuit for one of contactors 18, 19 or 20, the relay 67 opens its contacts 66 to interrupt the energizing circuit for contactor 21. This protection is afforded for each position of the selector switch 36 below its maximum speed or accelerating position D.

To obtain a higher speed of operation of the motor 10, which may correspond to need for increased ventilation, the selector switch may be moved to any of its positions B, C or D. For convenience, it will be assumed that the selector switch is now moved to position B from position A.

The selector switch itself is designed and constructed so that its bridging members 37, 37a, 55, 88 and 124 insulated from each other, interrupt the circuits completed in one position before completion of new circuits in a different position. Moreover, during movement of the selector switch from any position to any other position, the control circuits of intermediate positions are not completed. In consequence, the contactor 18 and the relay 53 are deenergized and move to their open or deenergized position as the selector switch is moved from its first position to the higher speed position B. As soon as the selector switch occupies position B, the bridging member 37 connects the stator winding 32 of the device 28 to the source of supply 22 at the same time deenergizing the previously selected stator winding 31. Due to the difference in the number of poles between the stator windings 31 and 32, sufficient voltage is induced by winding 32 in the winding 30 while still rotating at low speed corresponding with position A of the selector switch, to operate the master relay 29 to its closed or energized position. As described above, closure of the master relay 29 immediately energizes the relay 53 which again completes its own holding circuit through its contacts 58. At the same time closure of the contacts 51 of the master relay 29 completes an energizing circuit, identical with the one traced above, for the contactor 21, which thereupon closes to energize the motor accelerating winding 15. The motor now accelerates until its speed is exactly or approximately the synchronous speed corresponding to the number of poles of the selected stator winding 32. As before, the induced voltage in rotor winding 30 is thereby decreased sufficiently to produce operation of the master relay 29 to its deenergized position, thereby to deenergize the contactor 21 by interruption at contacts 51 of its energizing circuit. As contactor 21 moves to its open position, it closes its contacts 106 to complete, in combination with contacts 52 and 60 of the relays 29 and 53 an energizing circuit for the operating coil 107 of the contactor 19. This circuit may be traced from the supply line 39 by contacts 49, conductor 86, contacts 60 of relay 53, contacts 52 of master relay 29, conductor 87, bridging member 88 of speed-selector switch 36, conductor 108, interlock contacts 109, 110 and 106 of contactors 18, 20 and 21, conductor 111, operating coil 107 of contactor 19 and by conductor 83 to the other supply line 46.

The contactor 19 thereupon energizes the stator winding 13 for operation of the motor at increased speed, for example, 450 revolutions per minute.

As above described, the energizing circuits for relays 67, 94 and 96 are first completed and later interrupted. In addition, the relay 76 is energized upon closure of the contactor 19 by a circuit which may be traced from the supply line 39, contacts 49, conductor 54, contacts 95 of relay 94, interlock contacts 98 of contactor 18, conductor 112, contacts 113 of contactor 19, conductors 114, and 115, contacts 116 of an interlock relay 117, conductor 118, operating coil of relay 76, contacts 119, and 120 of relays 73 and 96, and by conductor 103 to the other supply line 46. The relay 76 completes its own holding circuit by closure of its contacts 121.

While additional movement of the selector switch 36 to positions C and D increases the speed of the motor by substantially the same sequence of operations heretofore described, if it is desired to decrease the speed of the motor by return of the selector switch to position A, provision is made so that the contactor 21 is not again closed. Assuming now that the selector switch 36 has been moved from position B to position A, it will be understood that the energizing circuit for the contactor 19 is interrupted during this movement and it, as well as the relay 53, returns to its open or deenergized position. The timing relay 94 is also deenergized but, due to its dash-pot, or other suitable provisions, it does not immediately open its contacts. Therefore, the movement of the selector switch 36 from position B to position A (or between other positions) does not cause the deenergization of the interlock relays. Thus the relay 76 is maintained in its energized position.

The return of the selector switch 36 to its first position reconnects the stator winding 31 of the device 28 across supply lines 22. In this case, the speed of the rotor winding 30, being higher than the synchronous speed of the winding 31, a substantial voltage is induced in it which causes closure of the relay 29 to again actuate the relay 53 as above described. However, the closing of the contacts 51 of the master relay 29 does not energize the contactor 21, since the energizing circuit therefor has been, and remains interrupted by the contacts 75 of the relay 76.

The motor 10, now deenergized, decreases in speed until it approaches the synchronous speed of the selected stator winding 31 of generator 28. The master relay 29 is thereupon deenergized and moves to close its contacts 52, which complete the energizing circuit traced above for the contactor 18. Upon closure of contactor 18, the motor winding 12 is energized to maintain the selected lower speed of rotation.

In case the motor is to be operated at a speed corresponding with the number of poles provided by the motor winding 14, it will be understood the selector switch 36 is moved directly to position C. Circuits are thereupon completed which are substantially identical with those traced above, first to close the contactor 21 and upon the attainment of the predetermined motor speed, to open the contactor 21 and subsequently to close the contactor 20. These circuits will be later traced in connection with the deceleration of the motor from its fourth speed to its third speed.

It will now be assumed the selector switch 36 is moved directly from its first position to its fourth position. The operation, of course, is the same as if it were moved from any of its positions directly to position D. As described above, the contactor 18 is deenergized and as the selector switch reaches position D a circuit is directly completed for the contactor operating coil 82. This circuit may be traced from the supply line 39 by contacts 49, conductors 54, 122, bridging member 88 of the selector switch 36, conductor 123, interlock contacts 78—80 of contactors 18—20, conductor 81, operating coil 82 of contactor 21 and by conductor 83 to the other supply line 46. Thereupon contactor 21 is operated to energize the high-speed motor winding 15 and to close its contacts 104.

By means of an additional contact segment 124 of selector switch 36, a circuit is completed to the relay 70 which may be traced from the supply line 39 by contacts 49, conductor 54, bridging member 124, conductor 125, and by operating coil of the relay 70 to the other supply line 46. The relay 70, by its contacts 126, completes its own holding circuit which may be traced from the supply line 39 by contacts 49, conductors 54, 127, interlock contacts 128, 129 and 130 of contactors 18, 19 and 20, conductor 131, contacts 126, and by the operating coil of relay 70 to the other supply line 46. The relay 70 at the same time opens its contacts 69 for purposes presently to be described.

Consequent to closure of contactor 21, the motor 10 accelerates to its maximum speed or the speed determined by motor winding 15.

When it is desired to decrease the speed of the motor and operate it at a speed corresponding with one of positions A, B or C of the selector switch 36, it is only necessary to move the selector switch to a selected position. For example, it will now be assumed that the selector switch is returned from position D to position C. By means of the bridging member 37 the stator winding 33 of the device 28 is connected to the source of supply 22. As above described, the master relay is opened and then closes immediately and effects closure of the relay 53 which again completes its own holding circuit. The closure of the contacts 51 of the master relay are not effective to reclose the contactor 21 since its energizing circuit is interrupted by the contacts 69 of the relay 70. Accordingly, the speed of motor 10 decreases until it approximates the synchronous speed of the selected stator winding 33. Thereupon the master relay 29 is deenergized to complete, by means of its contacts 52, an energizing circuit for the contactor 20. This circuit may be traced from the supply line 39 by contacts 49, conductor 86, contacts 60 and 52 of relays 53 and 29, conductor 87, bridging member 88 of the selector switch, conductor 132, interlock contacts 133, 134 and 135, of contactors 18, 19 and 21, conductor 136, operating coil 137 of contactor 20 and by conductor 83 to the other supply line 46. In consequence, the motor winding 14 of the motor 10 is energized to maintain the predetermined and selected motor speed which, in this case, may be 600 revolutions per minute.

Upon closure of the contactor 20 its contacts 138 are opened to interrupt the holding circuit for the relay 70 which thereupon operates to its deenergized position. The reclosure of its contact 69, however, does not energize the high-speed contactor 21 since its energizing circuit is kept open, for example, as by contacts 51 of the master relay 29 and by interlock contacts 88 operated with the contactor 20.

Upon closure of contactor 20, the contacts 73a, operated with it, are closed to energize the coil of relay 73 through a circuit which may be traced from the supply line 39, by contacts 49, conductor 54, contacts 95, interlock contacts 98 and 99 of contactors 18 and 19, contacts 73a, the operating coil of relay 73, contacts 120 of relay 96 and by conductor 103 to the other supply line 46. Upon actuation, the relay 73 completes its own holding circuit through its contacts 73b so that it is thereafter maintained in the energized position independently of the completion of the aforesaid circuit traced through contacts 73a. The actuation of this relay opens its contacts 72 and 119 for purposes of interlocking.

Further to reduce the motor speed, the selector switch 36 may be moved from position C to its position B, which, as above described, deenergizes contactor 20 and connects the winding 32 of device 28 to the source of supply 22. The master relay 29 first opens and then closes its contacts 50 to energize the relay 53. The closure of the contacts 51 of the master relay, however, is not effective to energize the accelerating contactor 21 since the relay 73 (which was closed with the contactor 20) is retained in its energized position with its contacts 72 effective to interrupt the energizing circuit for contactor 21. As the motor 10 slows down to a speed corresponding with the synchronous speed of the selected stator winding 32 of generator 28, the master relay 29 moves to its deenergized or open position to complete, through its contacts 52, an energizing circuit traced above for the operating coil 107 of the contactor 19. Upon closure of the contactor 19, its contacts 99 are opened to deenergize the relay 73.

It will be recalled that upon closure of contacts 113 of the contactor 19, the relay 76 is energized and operated to its closed position in which its own holding circuit is completed through its contacts 121.

To increase the motor speed, the selector switch 36 may, of course, be moved from its second to its third position. The contactor 19 is thereupon immediately deenergized and the stator winding 33 of device 28 is again connected to the source of supply 22. The master relay 29 thereupon closes its contacts 51 partially to complete an energizing circuit for the accelerating contactor 21. At the same time, i. e., when the selector switch 36 is moved to its third position, a circuit is completed by its bridging member 124 for the relay 117, which may be traced from the supply line 39 by contacts 49, conductor 54, bridging member 124 of the speed selector switch 36, conductor 139, contacts 139, closed by energization of relay 76, operating coil of relay 117, and by conductor 140 to the other supply line 46. Upon energization of relay 117 its contacts 116 are opened to deenergize the relay 76, the latter then closing its contact 75 to complete the energizing circuit for the accelerating contactor 21.

As before, upon closure of contactor 21, the motor winding 15 accelerates the motor to the selected speed, whereupon the master relay 29 is actuated to energize the proper motor winding, in this case the winding 14.

It will be observed the energizing circuit for each of the stator windings 31—33 of the device 28 extends from one phase or side of the alternating current source 22 by interlock contacts 141 of no-voltage relay 40, segment 87 of the speed selector switch 36, one of windings 31—33, conductors 142, 143, interlock contacts 144, 145, and 146, of contactors 18, 19 and 20, and by conductors 147 and 148 to the other supply line 22; as indicated above, this circuit has been shown for greater simplicity as a single-wire circuit though it in fact may be a three-wire circuit extending from the three-phase source of supply 22. After each operation of contactors 18—20 to the closed position, the device 28, by one of interlock contacts 144—146, is deenergized. In position D, the fourth position of the selector switch, its bridging member 37 does not complete a circuit to any of windings 31—33 and device 28 remains deenergized.

If the foregoing interlocking circuit connections were not provided, upon decrease in speed of the load and of rotor winding 30, the relay 29 would be energized and would operate to deenergize one of the contactors 18—20 and to energize contactor 21. After acceleration of the load by winding 15 to the selected speed, the relay would restore normal operation of the contactor corresponding to the selected speed. For application where it is desired to maintain the speed of the load fairly constant, the foregoing characteristic of the system may be used to advantage as will be later described.

From the foregoing, it will be apparent that the selector switch 36 may be operated from any position to any other position, the control system automatically functioning to produce the motor speed corresponding to that selected by operation of the switch 36.

Instead of operating the selector switch manually as indicated, it may be moved from one position to another in any desired sequence by suitable operating mechanism. Preferably, and as above indicated, the selector switch 36 either for manual or automatic operation is constructed so that the respective bridging members 55, 88 and 124 complete their respective circuits only after the selector switch has been moved to a predetermined one of its positions. This may be readily accomplished by requiring that the handle 36a of the selector switch shall be lifted to interrupt the connections completed by the bridging members before the selector switch can be moved to a different position, the handle 36a being lowered only after the selector switch has been moved to a selected one of its positions.

In the event of voltage failure or a substantial drop in the voltage of the supply lines, the no-voltage relay 40, as well as the other relays and contactors which may then be in their energized positions, move to their deenergized positions. Upon restoration of voltage, it is necessary for the operator momentarily to close the starting switch 38 in order to restore operation. Voltage dips, or failure of voltage for a few seconds duration frequently occur and it may be that during a voltage failure, the selector switch 36 is operated from one of its positions to another position, calling for a lower speed of operation of the motor 10. If, during the subsequent return of the voltage (and after operation of the starting switch 38) the motor speed is higher than that selected, it will be clear that the winding of the device 28 corresponding to the position of switch 36, will energize the master relay 29 to complete an energizing circuit for the accelerating contactor 21. Thus, while a lower speed may be selected, it will be seen that the closure of the accelerating contactor 21 actually causes the motor to increase its speed. Upon closure of the contactor 21, however, its contacts 104 in combination with the relay 94 complete an energizing circuit for the operating coil of the timing relay 67. After a predetermined time interval the relay 67 operates to open its contact 66 to deenergize the contactor 21. The relay 67 is designed to provide a time interval both during opening and closing of its contacts. The time interval required to open the contacts 66 is sufficient for acceleration of the motor from standstill to a speed corresponding to the third position of the selector switch 36 while the time interval before reclosure of the contacts 66 is sufficient for the motor speed to decrease from its maximum speed to one somewhat less than that corresponding to the first position of the selector switch.

After the aforesaid operations take place, and as soon as the motor speed decreases to a value corresponding to the position occupied by the selector switch 36, a corresponding one of the contactors 18, 19 or 20 is operated to energize the selected motor winding. At the same time, through one of contacts 98—100 the energizing circuit to the operating coil of timing relay 67 is broken to restore it to its closed position until such time as contacts 95, 98—100 and 104 are again reclosed.

In case the system is to function to maintain a substantially constant speed, irrespective of change in the load, it is only necessary to close the switch 149 which completes a by-pass or shunt circuit around the interlock contacts 144—146. The contactor 21 will then be energized after each predetermined reduction in speed of the drive shaft 10a occasioned by increased load. After the selected speed is again attained, the motor resumes operation by energization of a selected winding thereof.

In driving a ventilating fan or the like, the load ordinarily does not change for given speeds of operation. Accordingly, when the speed decreases, it is generally because of existence of abnormal conditions. For such applications it may be desirable automatically to disconnect the motor 10 from its source of supply. This is readily accomplished by closing the switch 149 and connecting an additional relay 150, Fig. 3, with contacts 151 arranged to interrupt the energizing circuit of contactor 21 normally traced by way of conductor 65. In Fig. 1 the contacts 151 are shown bridged by conductor 65. The additional circuits, shown in Fig. 3, comprise an energizing circuit for the operating coil of the relay 150 which may be traced, Figs. 1 and 3, from the supply line 39 by conductor 152 to the respective pairs of contacts 153, 154 and 155 of contactors 18—20. Upon closure of any one of these contactors, the foregoing circuit is completed and may be further traced by conductors 156, 157 and 158, operating coil of relay 150, and by a manually operable switch 158a to the other supply line 46.

Therefore, when a selected contactor is operated to energize a selected motor winding the relay 150 is operated. It completes through contacts 159 its own holding circuit derived from conductor 56 which, it will be remembered, is connected in circuit with the bridging member 55 of the selector switch.

Assuming that the motor speed has decreased below one of the lower speeds of operation, the relay 29, as described above, is energized and would ordinarily by its contacts 52 deenergize the selected one of contactors 18-20 and by its contacts 51 complete by way of conductor 65 an energizing circuit for the contactor 21. Since, however, the relay 150 has opened the circuit to the contactor 21, acceleration is prevented. The motor as a whole is deenergized.

Operation may be resumed by momentarily operating the stop and starting switches 41 and 38 in the order named, or by moving the selector switch 36 to interrupt the holding circuit for the relay 150, which is traced through bridging member 55.

In this manner there is provided protection against abnormal conditions and additional overload protection is provided which may be supplemental to or in place of the overload transformers 24, Fig. 2.

The manually operable switch 158a, Fig. 3, if moved to its open position, interrupts the circuit to the operating coil of relay 150 and serves selectively to determine whether there shall be effective (switch 158a closed) both the overload protection afforded by transformers 24, Fig. 2 and by relay 150, or (switch 158a open) only the protection by said transformers.

As already stated, control of ventilation by speed control of the fan or fans imposes for each speed a substantially constant load on the driving motor. However, if damper-control of draft is utilized the motor-load may vary with resultant change in its speed. Under the last-named condition, it may be desirable to open the switch 158a to disable the relay 150, particularly when the speed variation produces undesired operation of relay 150.

While I have shown particular embodiments of my invention, it will be understood, of course, that I do not wish to be limited thereto, since many modifications may be made, and I, therefore, contemplate by the appended claims to cover any such modifications as fall within the true spirit and scope of my invention.

What I claim is:

1. In a system for controlling a multi-speed alternating current motor, the combination of circuit controlling means for selectively controlling the energization of said motor for different speeds of operation thereof, a relay, a rotary electrical device having relatively rotatable elements, means for driving one of said elements with respect to the other in accord with the speed of said motor, a system of windings on each of said elements, means for connecting said relay to one of said windings, one of said elements at a given speed producing insufficient current in said one of said windings to energize said relay, and for all other speeds producing sufficient current in said one winding to maintain said relay in its energized position, and a relay system including said first-named relay for controlling operation of said circuit controlling means to energize said motor for a selected speed of operation.

2. A system for controlling a multi-speed alternating current motor comprising a selector switch operable through predetermined positions, respectively corresponding to the speeds of operation of the motor, a rotary electrical device having a rotor winding driven by said motor and a plurality of stator windings, a relay, means including said selector switch for connecting said rotor winding in circuit with said relay and for energizing a given one of said stator windings for each one of said positions, each of said stator windings inducing sufficient current in said rotor winding to maintain said relay in one position for all speeds except the one corresponding to the position of said selector switch, a plurality of contactors each operable upon closure thereof, to energize said motor for operation at a given one of its speeds, a relay system including said first-named relay for closing one of said contactors prior to closure of any of the remaining contactors for ecceleration of said motor, and means, including said first-named relay and said selector switch, for opening said one contactor and concurrently closing a selected one of said remaining contactors upon attainment of a motor speed corresponding to a given position of said selector switch.

3. A system for controlling a multi-speed alternating current motor comprising a selector switch operable through predetermined positions, respectively corresponding to the speeds of operation of the motor, a rotary electrical device having a rotor winding driven by said motor and a plurality of stator windings, a relay, means including said selector switch for connecting said relay in circuit with said rotor winding and for energizing a given one of said windings for each one of said positions, said windings respectively maintaining said relay in a predetermined position for all motor speeds except the one corresponding to said switch-position, a plurality of contactors each operable upon closure thereof, to energize said motor for operation at a given one of its speeds, a relay system including said first-named relay for closing one of said contactors prior to closure of any of the remaining contactors for acceleration of said motor, means, including said first-named relay and said selector switch, for deenergizing said one accelerating contactor and for energizing a selected one of said remaining contactors upon attainment of a motor speed corresponding to a given position of said selector switch, and means automatically operable upon movement of said selector switch to a lower speed position for preventing closure of said accelerating contactor.

4. In a system for controlling a multi-speed alternating current motor-driving means having a plurality of windings for producing respectively a plurality of different driving speeds, the combination of a plurality of contactors respectively controlling the energization of said windings, means for selecting a given speed of operation of said motor and means operable upon movement of said selecting means from a lower to a higher selected speed for first operating the contactor for high-speed operation of said driving means, means automatically operable upon attainment of a selected motor speed for producing operation of said high-speed contactor to deenergize said driving means and for operating another of said contactors to energize said driving means for its selected speed of operation, and means controlled by said last-named contactor for preventing operation of said high-speed contactor upon movement of said selecting means from a higher to a lower selected speed.

5. In a system for controlling a multi-speed alternating current motor having a plurality of windings for producing respectively a plurality of different motor speeds, the combination of contactors respectively controlling the energization of each of said windings, a selector switch for selecting a given speed of operation of said motor, means operable for all positions of said selector switch when a higher speed is selected for energizing the contactor for the high-speed operation of said motor, means automatically operable upon attainment of a selected motor speed less than its highest speed for deenergizing said high-speed contactor and for energizing the contactor corresponding to the selected speed of operation of said motor, and relay means for preventing energization of said high-speed contactor upon movement of said selector switch to a motor-speed position lower than the motor-speed position last occupied by said selector switch.

6. In a system for controlling a multi-speed alternating current motor having a plurality of windings each of which is arranged to operate the motor at a different speed, the combination of an accelerating contactor for energizing one of said windings, additional contactors for each of the remaining windings, selective means for starting and accelerating said motor to a predetermined speed comprising a relay system for first operating said accelerating contactor and upon attainment of a predetermined speed thereafter deenergizing said accelerating contactor and operating a selected one of said other contactors, and time-delay means operable after a predetermined voltage reduction for preventing continued operation at a speed higher than that selected.

7. In a system for controlling an alternating current motor-driving means having a plurality of windings each of which is arranged to produce operation of the driving means at a different speed, the combination of an accelerating contactor for energizing one of said windings, an additional contactor for energizing each of the remaining windings, selective means for starting and accelerating said motor-driving means to a predetermined speed comprising a relay system for first operating said accelerating contactor and upon attainment of a predetermined speed for deenergizing said accelerating contactor and for thereafter operating a selected one of said other contactors to energize its associated winding, and means controlled by operation of said selected contactor for preventing operation of said accelerating contactor upon movement of said selecting means from a higher to a lower selected speed.

8. In a system for controlling an alternating current motor having a plurality of windings each of which is arranged to operate the motor at a different speed, the combination of an accelerating contactor for energizing one of said windings, an additional contactor for energizing each of the remaining windings, selective means for starting and accelerating said motor to a predetermined speed comprising a relay system for first operating said accelerating contactor and upon attainment of a predetermined speed for deenergizing said accelerating contactor and for thereafter operating a selected one of said other contactors to energize its associated winding, means controlled by operation of said selected contactor for preventing operation of said accelerating contactor upon movement of said selecting means from a higher to a lower selected speed, and means operable upon movement of said selective means from a lower to a higher selected speed for producing operation of said accelerating contactor and upon attainment of a predetermined speed thereafter operating the contactor corresponding to the higher selected speed.

9. In a system for controlling an alternating current motor having a plurality of windings respectively producing different motor speeds, the combination of contactors respectively controlling the energization of each of said windings, a selector switch for selecting a given speed of operation of said motor, means operable for all positions of said selector switch when a higher speed is selected for energizing the contactor for the highest speed of operation of said motor, means automatically operable upon attainment of a selected motor speed less than its highest speed for deenergizing said high-speed contactor and for energizing the contactor corresponding to the selected speed of operation of said motor, and relay means for preventing energization of said high-speed contactor upon movement of said selector switch to a motor-speed position lower than the motor-speed position last occupied by said selector switch, said selector switch when operated to a position corresponding to the highest motor speed disabling said automatically operable means until return of said selector switch to one of its lower speed positions.

10. In a system for controlling an alternating current motor having a plurality of windings each of which is arranged to operate the motor at a different speed, the combination of an accelerating contactor for energizing one of said windings, an additional contactor for each of the remaining windings, means for starting and accelerating said motor to a predetermined speed comprising a relay system for first operating said accelerating contactor, a selector switch operable to different positions corresponding in number with said plurality of motor windings, speed-responsive means operable upon attainment of a speed corresponding with the position occupied by said selector switch for deenergizing said accelerating contactor and for concurrently operating the one of said additional contactors corresponding with the position occupied by said selector switch, and means for preventing operation of said speed-responsive means to deenergize said motor as a result of decrease in its speed from that corresponding with the position occupied by said selector switch.

11. In a system for controlling an alternating current motor having a plurality of windings each of which is arranged to operate the motor at a different speed, the combination of an accelerating contactor for energizing one of said windings, an additional contactor for each of the remaining windings, means selectively and automatically operable from one position to another upon attainment of a selected motor-speed, means including a selector switch for producing operation of said selective means at a selected speed, a relay system for first operating said accelerating contactor to increase the motor speed, in response to operation of said selective means at said selected speed, then to operate said accelerating contactor to deenergize said motor, and concurrently to operate the selected contactor for continued operation of said motor at said selected speed, and means operable by said selected contactor for disabling said selective means.

12. In a system for controlling an alternating current motor having a plurality of windings each of which is arranged to operate the motor at a different speed, the combination of an accelerating contactor for energizing one of said windings, an additional contactor for each of the remaining windings, means selectively and automatically operable from one position to another upon attainment of a selected motor-speed, means including a selector switch for producing operation of said selective means at a selected speed, a relay system for first operating said accelerating contactor to increase the motor speed, and in response to operation of said selective means at said selected speed to operate said accelerating contactor to deenergize said motor and for operating a selected contactor for continued operation of said motor at said selected speed, means operable by said selected contactor for disabling said selective means, and means for rendering ineffective said disabling means, said selective means in response to decreased motor speed controlling operation of said accelerating contactor and of said selected contactors to maintain substantially constant the speed of said motor.

13. In a system for controlling an alternating current motor having a plurality of windings each of which is arranged to operate the motor at a different speed, the combination of an accelerating contactor for energizing one of said windings, an additional contactor for each of the remaining windings, selective means for starting and accelerating said motor to a predetermined speed comprising a relay system for first operating said accelerating contactor and upon attainment of a predetermined speed thereafter operating a selected one of said other contactors, and time-delay means for preventing continued operation at a speed higher than any selected comprising a relay operable with a time delay from one position to another for producing operation of said accelerating contactor to deenergize said motor thereby permitting its speed to decrease, said selective means upon decrease of said speed to that selected operating one of said contactors to energize the motor winding corresponding to the selected speed.

14. In a system for controlling an alternating current motor having a plurality of windings for producing respectively a plurality of different motor speeds, the combination of an accelerating contactor for energizing one of said windings, an additional contactor for each of the remaining windings, the combination of a master relay, selective means operable through positions respectively corresponding to said plurality of speeds of said motor for controlling operation of said relay, said selective means including means responsive to the speed of said motor for producing operation of said relay from a first position to a second position for all speeds of said motor above or below a selected speed and for producing operation from said second to said first position upon attainment of each selected motor speed, relays respectively operable upon closure of each of said additional contactors, except the one for lowest speed of operation, for preventing energization of said one winding by said accelerating contactor upon movement of said selective means from a higher to a lower speed position, an energizing circuit completed by said selective means and said master relay when in its second position for operating said accelerating contactor to start and accelerate said motor, said master relay upon operation to its first position interrupting said circuit, and an energizing circuit completed by return of said master relay to its first position for operating the additional contactor corresponding to the selected speed of said motor.

15. In a system for controlling an alternating current motor having a plurality of windings for producing respectively a plurality of different motor speeds, the combination of an accelerating contactor for energizing one of said windings, an additional contactor for each of the remaining windings, the combination of a master relay, selective means operable through positions respectively corresponding to said plurality of speeds of said motor for controlling operation of said relay, said selective means including means responsive to the speed of said motor for producing operation of said relay from a first position to a second position for all speeds of said motor above or below a selected speed and for producing operation from said second to said first position upon attainment of each selected motor speed, interlock relays respectively operable upon closure of each of said additional contactors, except the one for lowest speed of operation, for preventing energization of said one winding by said accelerating contactor upon movement of said selective means from a higher to a lower speed position, a relay operable from a closed to an open circuit position with a time delay to prevent deenergization of said interlock relays during operation of said selective means from one position to another, an energizing circuit completed by said selective means and said master relay when in its second position for operating said accelerating contactor to start and accelerate said motor, said master relay upon operation to its first position interrupting said circuit, and an energizing circuit completed by return of said master relay to its first position for operating the additional contactor corresponding to the selected speed of said motor.

16. In a system for controlling an alternating current motor having a plurality of windings each of which is arranged to operate the motor at a different speed, the combination of an accelerating contactor for controlling the energization of one of said windings, additional contactors respectively controlling energization of said other windings, a selector switch movable through a plurality of positions, and in each partially completing an energizing circuit for a corresponding selected one of said additional contactors, a master relay operable from a first to a second position to complete an energizing circuit for said accelerating contactor, a second relay operable from a first to a second position after corresponding operation of said master relay partially to complete the energizing circuit for said selected contactor, said master relay upon return to its first position interrupting said energizing circuit of said accelerating contactor and for completing said energizing circuit of said selected contactor, and means rendered effective by said selector switch for retaining said master relay in its second position for all motor speeds except the one corresponding to the position occupied by said selector switch.

17. A control system for an alternating current motor having a number of windings, one of which is an accelerating winding, and each of the remaining windings having a different number of poles for different speeds of operation of said motor, comprising a contactor individual to, and controlling the energization of, each of said windings, a translating device comprising relatively rotatable elements one of which is driven by said motor, a rotor winding supported on the element driven by said motor, a plurality of stator windings supported on the other of said elements, each of said last-named windings having a different number of poles for producing, in the region of said rotor winding, magnetic fields respectively rotating at different synchronous speeds and in the same direction as said rotor winding, a relay maintained in one position by current from said rotor winding for all speeds thereof differing from one of said synchronous speeds, means for selectively controlling the energization of said stator windings for controlling operation of said relay from said one position to a second position, and relay means operable under the control of said relay to control the energization of said contactors, first to energize said accelerating winding and upon attainment of a selected speed of said motor to deenergize said accelerating contactor and to energize the contactor corresponding to said selected speed as determined by said selective means.

18. A system for controlling an induction motor having a plurality of windings each providing for a different predetermined speed of operation thereof, the winding for highest speed developing sufficient torque to accelerate said motor under full load from standstill to its highest speed, comprising a translating device having stator windings one less in number than said windings of said motor and respectively producing rotating magnetic fields of differing speeds, and a rotor winding inductively associated with said stator windings and driven by said motor, a relay connected in closed circuit relation with said rotor winding, the induced voltage in said rotor winding decreasing substantially to zero, for either increasing or decreasing motor speed, upon attainment by said rotor winding of a speed equal to the speed of said field produced by one of said stator windings, selective means for partially completing an energizing circuit for a selected one of said contactors, and relay means controlled by said relay first to energize said highest-speed winding to accelerate said motor and upon the attainment of a selected speed to deenergize said high speed winding and to energize the motor winding corresponding to said selected speed, and means for preventing energization of said highest speed winding when said selective means is operated from a higher motor-speed position to a lower motor-speed position.

19. Means for controlling a motor having a plurality of windings for effecting different predetermined speeds of the motor, comprising a plurality of contactors respectively controlling energization of said windings, an electric relay for controlling operation of said contactors, a speed-selecting switch operable through a plurality of positions respectively corresponding to the different motor speeds, and means controlled by said switch and responsive to the speed of said motor for preventing, for all motor speeds except the one corresponding to the position of said speed-selecting switch, operation of said relay and that contactor corresponding to the position of said switch, said speed-responsive means, upon attainment by said motor of the selected speed, rendering said relay effective to energize the motor winding determinative of the selected motor speed.

20. Means for controlling a motor having a plurality of windings for effecting different predetermined speeds of the motor, comprising a plurality of contactors respectively controlling energization of said windings, an electric relay for controlling operation of said contactors, a speed-selecting switch operable through a plurality of positions respectively corresponding to the different motor speeds and in each position rendering said relay effective to control operation of the contactor corresponding to the position occupied by said switch, and means responsive to the speed of said motor and selectively operable under the control of said switch for preventing, for all speeds except that selected, operation of said relay and that contactor corresponding to the position of said switch, said speed-responsive means, upon attainment by the motor of the selected speed, producing operation of said relay and of said selected contactor to energize the motor winding determinative of the selected motor speed.

21. Means for controlling a motor having a plurality of windings for effecting different motor speeds, comprising a plurality of contactors respectively controlling energization of said windings, a single-coil frequency-responsive relay for controlling operation of each of said contactors, a speed-selecting switch operable through a plurality of positions respectively corresponding to the different motor speeds, a translating device driven by said motor for energizing said single coil of said relay, the frequency of the output of said device varying with the speed of said motor, and means including said switch for controlling operation of said relay by said translating device to effect operation, only when said motor speed corresponds with the selected speed, of that contactor determinative of the selected speed.

22. A system for controlling a multi-speed alternating current motor having a plurality of windings selectively energizable for operation of the motor at different speeds, a generator driven by said motor having a plurality of windings respectively effecting, when energized, null output of said generator at said different motor speeds, and means for effecting operation of the motor at a desired speed comprising switching means for selecting for subsequent energization that one of said motor windings corresponding with said desired speed and for selecting and energizing that one of said generator windings which effects null generator output at said desired speed, and relay means responsive during operation of the motor to null output of said generator for effecting energization of said selected motor winding.

23. A system for controlling a multi-speed alternating current motor having a high-speed winding and at least two windings for effecting lower speeds of said motor, a generator driven by said motor having a plurality of windings respectively effecting, when energized, null output of said generator at said lower motor speeds, means for effecting operation of the motor at a desired low speed comprising switching means for selecting for subsequent energization that one of said low-speed motor windings corresponding with said desired low speed and for selecting and energizing that one of said generator windings which effects null generator output at said desired low speed, and relay means responsive, during operation of the motor, to null output of said generator for effecting energization of said selected motor winding, and relay means for energizing said high-speed winding of the motor whenever acceleration of the motor is necessary to attain said desired low speed, said first-named relay means effecting deenergization of said high-speed winding when the desired low motor speed is attained.

24. A system for controlling a multi-speed alternating current motor having a high-speed winding and at least two windings for effecting lower speeds of said motor, a generator driven by said motor having a plurality of windings respectively effecting, when energized, null output of said generator at said lower motor speeds, means for effecting operation of the motor at a desired low speed comprising switching means for selecting for subsequent energization that one of said low-speed motor windings corresponding with said desired low speed and for selecting and energizing that one of said generator windings which effects null generator output at said desired low speed, and relay means responsive, during operation of the motor, to null output of said generator for effecting energization of said selected motor winding, relay means for energizing said high-speed winding of the motor whenever acceleration of the motor is necessary to attain said desired low speed, said first-named relay means effecting deenergization of said high-speed winding when the desired low speed is attained, and relay means for precluding operation of said second-named relay means whenever deceleration of the motor is necessary to attain the selected low speed.

25. Means for controlling a motor, having a plurality of windings for effecting different speeds thereof, comprising a source of alternating current whose frequency is dependent upon the speed of said motor, a plurality of contactors respectively controlling energization of said motor windings, a relay energized solely from said source for controlling said contactors, a speed-selecting switch operable through a plurality of positions corresponding, respectively, with the different motor speeds, and means including said switch for controlling operation of said relay, only when said motor speed corresponds with the selected speed, by said source to effect operation of that contactor determinative of the selected speed.

26. Means for controlling a motor, having a high-speed winding and at least two windings for effecting lower and different motor speeds, comprising a source of alternating current whose frequency is dependent upon the speed of said motor, a relay energized solely from said source, a speed-selecting switch operable through a plurality of positions corresponding, respectively, with the different motor speeds, and means, including said relay and said speed-selecting switch, operative, whenever said switch is moved to a position corresponding with any of aforesaid lower motor speeds to attain which the motor accelerates, for effecting energization of the high-speed winding until the motor accelerates to the selected speed, said relay responding to the speed then attained to effect energization of the winding corresponding to the selected speed, and said means operative, whenever said switch is moved from a higher to any non-adjacent lower speed position, to effect energization only of the corresponding lower-speed motor winding only upon deceleration of the motor to said selected lower speed.

27. A system comprising a source of power, a motor having at least three windings for driving it at at least three different speeds, switching means movable to select any one of said windings for energization from said source, means responsive to the speed of said motor, and relay means, in cooperation with said switching means and said speed-responsive means, operative upon movement of said switching means from a position corresponding with one speed of said motor to a position corresponding with any selected lower speed to effect, when the motor decelerates to said lower speed, energization of the selected lower speed winding, and operative to preclude energization of any other of said motor windings in the interim between said movement of said switching means and aforesaid energization of said lower-speed winding.

28. A system comprising a source of power, a motor having a plurality of windings each for driving the motor at a different speed, switching means movable to select any one of said windings for energization from said source, a single means responsive to the speed of said motor, and relay means cooperating with said switching means and said single speed-responsive means, to effect, upon movement of said switching means from a position corresponding with one speed of said motor to a position corresponding with a lower speed, energization of the corresponding lower speed winding when the motor in deceleration first reaches said lower speed.

29. A system comprising a source of power, a motor having at least three windings each driving the motor at a different speed, switching means movable to select any one of said windings for energization from said source, means responsive to the speed of the motor, and means cooperating with said switching means and said speed-responsive means effective, upon movement of said switching means from any higher to any non-adjacent lower speed position, directly to effect energization of the winding corresponding with the selected lower speed without intervening energization of any other motor winding.

30. A control system comprising a source of power, a motor having a plurality of windings each for driving said motor at a different speed, switching means for selectively connecting any one of said windings to said source, an alternating current generator driven by said motor, a frequency-responsive relay energized by said generator and controlling said switching means, and a second switching means for selecting the motor speed at which said relay shall operate.

WILLIAM M. SCOTT, Jr.